H. A. WEIR.
SCALE.
APPLICATION FILED JULY 24, 1916.

1,244,930.

Patented Oct. 30, 1917.
2 SHEETS—SHEET 1.

WITNESSES
Howard F Costello
Ross J Woodward

INVENTOR
Harold A. Weir
BY Richard Owen.
ATTORNEY

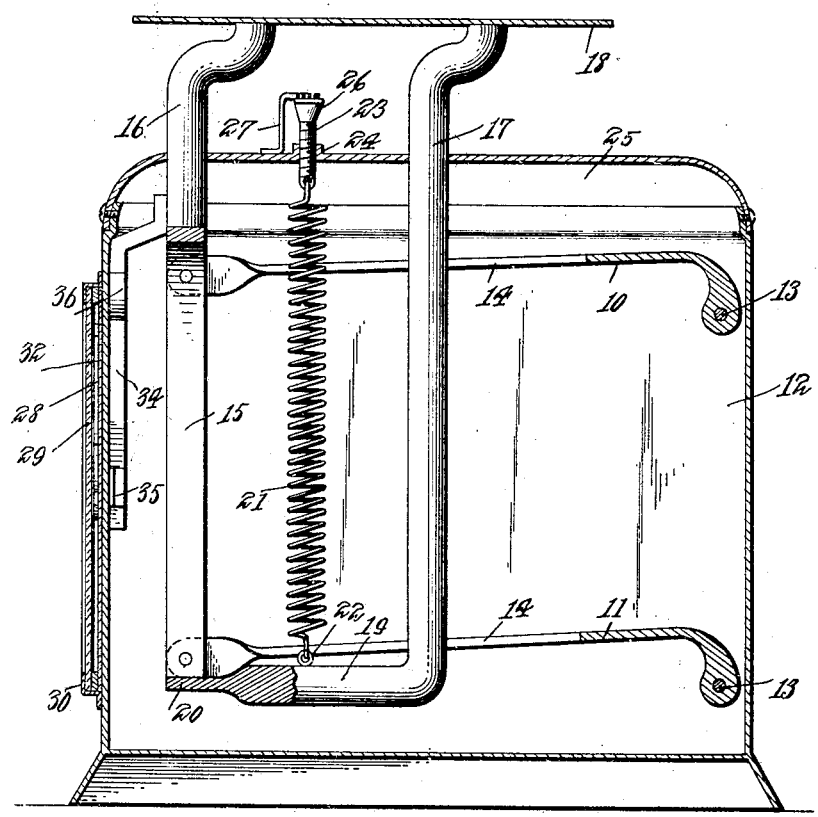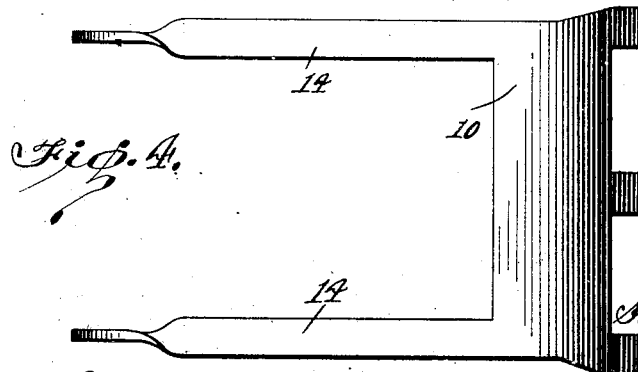

UNITED STATES PATENT OFFICE.

HAROLD A. WEIR, OF WILLIS, KANSAS.

SCALE.

1,244,930.  Specification of Letters Patent.  Patented Oct. 30, 1917.

Application filed July 24, 1916. Serial No. 111,022.

*To all whom it may concern:*

Be it known that I, HAROLD A. WEIR, a citizen of the United States, residing at Willis, in the county of Brown and State of Kansas, have invented certain new and useful Improvements in Scales, of which the following is a specification.

This invention relates to an improved scale which is intended to be used for weighing packages to go by parcel post and the principal object of the invention is to provide an improved type of scale so constructed that the package may be accurately weighed, the dial being marked so that it will indicate both the weight of the package and also the postage required, the zone being marked upon the face of the dial and the postage for each zone according to the number of pounds. Thus if a package weighs a given number of pounds, it can be readily ascertained what the amount of postage will be by the dial if it is known in what zone the town to which the package is to be sent is located.

Another object of the invention is to provide improved mechanism for mounting the platform, this mechanism including means for turning the indicating arrow carrying shaft as the platform carrying arms or standards move vertically.

This invention is illustrated in the accompanying drawings, wherein:—

Fig. 2 is a view showing the scale in vertical section.

Fig. 4 is a top plan view of one of the brackets for carrying the platform supporting arms or standards.

Figure 1:
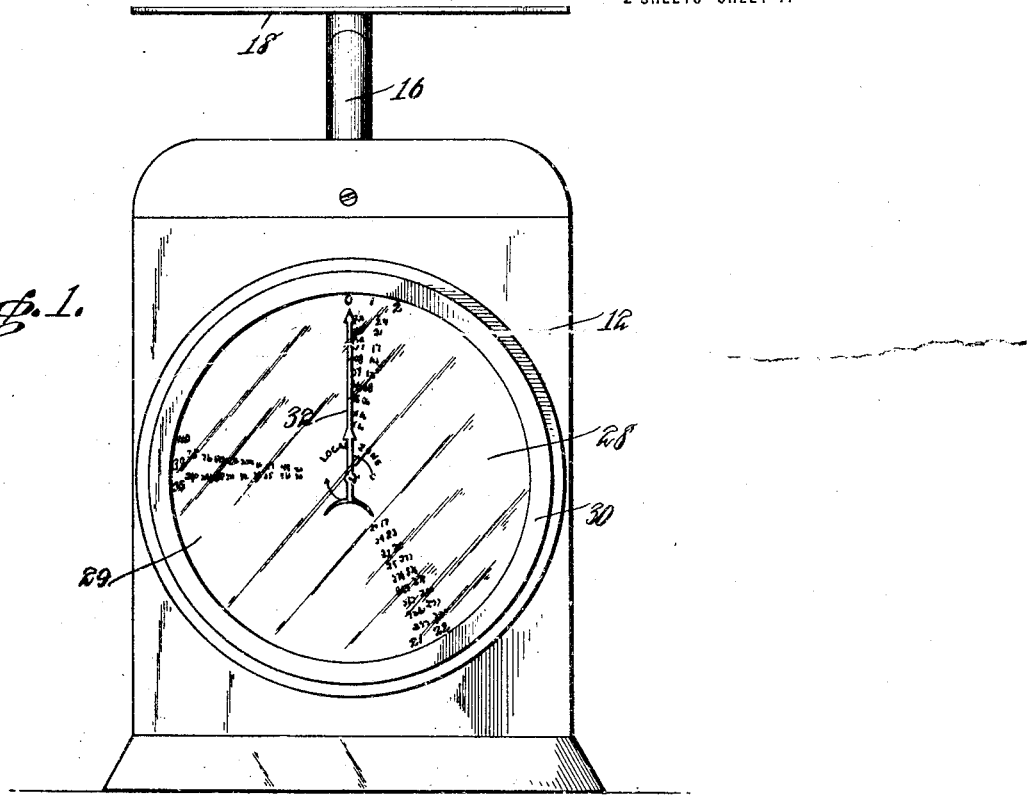
Figure 1 is a view showing the improved scale in front elevation.
Figure 3:
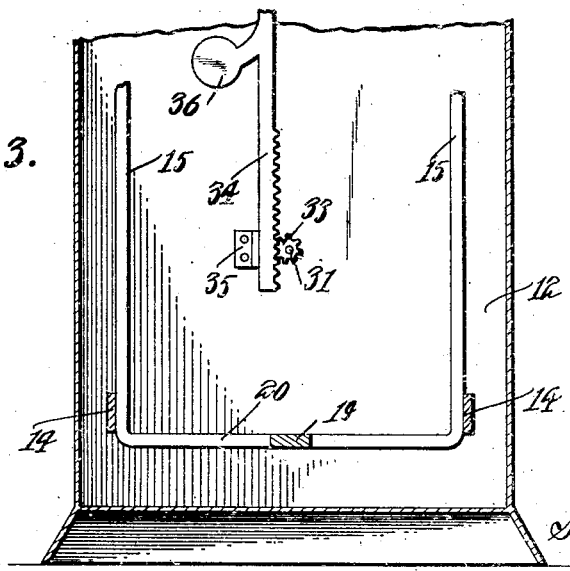
Fig. 3 is a fragmentary sectional view looking toward the front wall of the scale.

The brackets 10 and 11 are pivotally mounted in the housing 12 as shown at 13 and have their arms 14 extending toward the forward wall of the housing and pivotally connected with the arms 15 of the forward standard 16. The rear standard 17 which is positioned behind the forward standard and assists the forward standard in carrying the platform 18 has its lower end portion provided with an arm 19 which extends forwarding to the cross bar 20 connecting the arms 15 of the forward standard, It will thus be seen that the standards will move together when a weight is placed upon the platform 18. A spring 21 has its lower end connected with the eye 22 of the arm 19 and its upper end connected with the threaded adjusting screw 23 which is screwed into a socket 24 formed in the upper wall or cover 25 of the housing 12 and provided with an enlarged and toothed head 26 which is engaged by a latch 27. By means of this adjusting screw 23, the tension of the spring can be controlled and thus the scale caused to weigh accurately, the latch 27 preventing the screw from being accidentally turned.

The dial 28 is placed against the outer face of the forward wall of this housing 12 and covered by the glass 29 carried by the frame 30 and is provided with an opening registering with an opening in the front wall of the housing, so that the shaft 31 may be rotatably mounted and extends through the housing and dial. This shaft 31 has indicating arrows 32 upon its outer end portion and the gear wheel 33 upon its inner end portion. This gear 33 is engaged by the teeth of the rack bar 34 which rack bar is pivotally connected at its upper end with the forward standard 16 and is engaged by the bracket 35 so that it will be held in engagement with the gear wheel 33. A weight 36 is provided intermediate the height of this rack bar in order to assist in holding the rack bar in engagement with the gear wheel. When in use, a package is placed upon the platform and as the platform moves downwardly, the rack bar 34 will rotate the gear wheel 33 thus turning the hands to indicate upon the scale the weight of the package. This dial is divided into sections showing the zones and opposite each zone and beneath each of the weight indicating marks, there is placed the postage which would be required for the different zones according to the weight of the article. Therefore it can be readily ascertained, the amount of postage which would be required for a package which is to be sent to a city in a given zone, the package weighing a certain number of pounds. I have therefore provided a scale which would be very convenient in use for sending parcel post packages. It is of course obvious that the markings upon the dial could be changed so that instead of indicating the zone and the cost for a given zone, it could indicate the weight in pounds and the cost of an article at a given rate per pound.

What is claimed is:—

1. A scale comprising a housing, upper and lower brackets pivotally mounted in said housing, a forward standard provided with arms pivotally connected with the brackets and having a cross bar connecting the lower end portions of the arms, a rear standard provided at its lower end with a neck extending to the coss bar, an adjusting screw provided with a head having teeth, a latch engaging the teeth to releasably hold the adjusting screw in a set position, a spring connected with said adjusting screw and with the neck of the rear standard, a platform carried by said standards, a rotatably mounted shaft, a pointer carried by said shaft, a gear wheel carried by said shaft, and a rack bar connected with the forward standard and having its teeth engaging the teeth of said gear wheel whereby vertical movement of said standards will rotate said shaft.

2. A scale comprising a housing, upper and lower brackets pivotally mounted in said housing, a standard provided with arms pivotally connected with the brackets, a rod extending from the standard, an adjusting screw provided with a head having teeth, a latch engaging the teeth to releasably hold the adjusting screw in a set position, a spring connected with said adjusting screw and with the rod, a platform carried by the standard, a pointer, and means actuated from the standard for imparting movement to the pointer when the standard moves.

In testimony whereof I affix my signature in presence of two witnesses.

HAROLD A. WEIR.

Witnesses:
FRANK C. CROWLEY,
HENRY P. PATTON.

Copies of this patent may be obtained for five cents each, by addressing the "Commissioner of Patents, Washington, D. C."